United States Patent [19]

Takeuchi et al.

[11] Patent Number: 4,591,348

[45] Date of Patent: May 27, 1986

[54] DAMPER DISC WITH SELF-ALIGNING SPRING SEATS

[75] Inventors: Hiroshi Takeuchi, Higashi-Osaka; Toru Hamada, Takatsuki, both of Japan

[73] Assignee: Kabushiki Kaisha Daikin Seisakusho, Osaka, Japan

[21] Appl. No.: 687,569

[22] Filed: Dec. 28, 1984

[30] Foreign Application Priority Data

Jan. 5, 1984 [JP] Japan .................................. 59-309[U]

[51] Int. Cl.$^4$ .............................................. F16D 3/14
[52] U.S. Cl. .................................. 464/64; 192/106.2; 464/66
[58] Field of Search ........................... 192/70.17, 106.2; 464/63, 64, 66, 68

[56] References Cited

U.S. PATENT DOCUMENTS

| | | | |
|---|---|---|---|
| 1,510,943 | 10/1924 | Kjelsberg | 464/66 |
| 2,321,941 | 6/1943 | Rose | 464/68 |
| 2,437,537 | 3/1948 | Kelleher | 464/68 |
| 2,674,863 | 4/1954 | Thelander | 464/68 |
| 4,148,200 | 4/1979 | Schallhorn et al. | 464/66 X |
| 4,351,168 | 9/1982 | Prince et al. | 464/68 X |
| 4,493,674 | 1/1985 | Tamura et al. | 464/68 |
| 4,494,642 | 1/1985 | Hashimoto | 464/68 X |

FOREIGN PATENT DOCUMENTS

| | | | |
|---|---|---|---|
| 1530543 | 2/1970 | Fed. Rep. of Germany | 464/68 |
| 70203 | 6/1952 | Netherlands | 464/66 |
| 1196811 | 7/1970 | United Kingdom | 192/106.2 |

Primary Examiner—John M. Jillions
Assistant Examiner—Daniel P. Stodola
Attorney, Agent, or Firm—Burns, Doane, Swecker & Mathis

[57] ABSTRACT

A damper disc has side plates adapted to be connected to a torque input part so as to coaxially rotate therewith. A hub is connected to a torque output part and rotates coaxially to the side plates. A sub-plate is adapted to torsionally turn with respect to the side plates and the hub and is disposed coaxially thereto. A first spring mechanism circumferentially connects the sub-plate to the hub. A second spring mechanism circumferentially connects the side plates to the sub-plate. The spring mechanisms include a plurality of torsion springs disposed in series and spring seat units interposed between the adjacent springs. These spring seat units include a spring seat to which one of the springs is seated, a second spring seat to which another one of these springs is seated and a connecting means for connecting both spring seats together so that both spring seats can change their orientation with respect to the radial direction of the disc.

12 Claims, 4 Drawing Figures

DAMPER DISC WITH SELF-ALIGNING SPRING SEATS

BACKGROUND OF THE INVENTION

The present invention relates to a damper disc for use as a clutch disc in an automobile, an agricultural machine or an industrial machine as well as a damper in a driving system of a boat and the like.

Japanese Utility Model application 57-10387 (U.S. patent application Ser. No. 421,338) has disclosed a damper disc in which compressible coil springs are disposed in series between an input member and an output member. In such disc, a spring seat or seats are interposed between the springs disposed in series in a set of openings of the input and output members. However, in this structure, there is a difference between the force applied to radially inner portions (with respect to the radial direction of the disc) of the springs and the force applied to the radially outer portions of the springs, when the springs are compressed, because the direction of the surfaces of the spring seats to which the springs are seated does not change with respect to the radial direction of the disc after the compression of the springs. This difference of the forces or loads may decrease durability of the springs. Further, the compressed springs may protrude radially outwardly and contact the edge of the opening. This contact and the friction force caused thereby deteriorates a damping characteristic of the disc, so that noises in a drive system, such as a transmission, can not be absorbed effectively.

SUMMARY OF THE INVENTION

Accordingly, it is an object of the invention to provide an improved disc, overcoming the above-noted problems.

The damper disc according to the invention comprises side plates adapted to be connected for a torque input part to coaxially rotation therewith; a hub adapted to be connected to a torque output part to rotate coaxially to the side plates; a sub-plate adapted to torsionally turn with respect to the side plates and the hub and being disposed coaxially thereto; a first spring mechanism circumferentially connecting the sub-plate to the hub; and a second spring mechanism circumferentially connecting the side plates to the sub-plate; said spring mechanisms respectively including a plurality of torsion springs disposed in series and spring seat units interposed between the adjacent springs, said spring seat units including a spring seat to which one of the springs is seated, another spring seat to which another on of springs is seated and a connecting means for connecting both spring seats together so that both spring seats can change their directions with respect to the radial direction of the disc.

Other and further objects, features and advantages of the invention will appear more fully from the following description of the preferred embodiments of the invention.

DETAILED DESCRIPTION OF THE PREFERRED EMBODIMENTS

Figure 1:
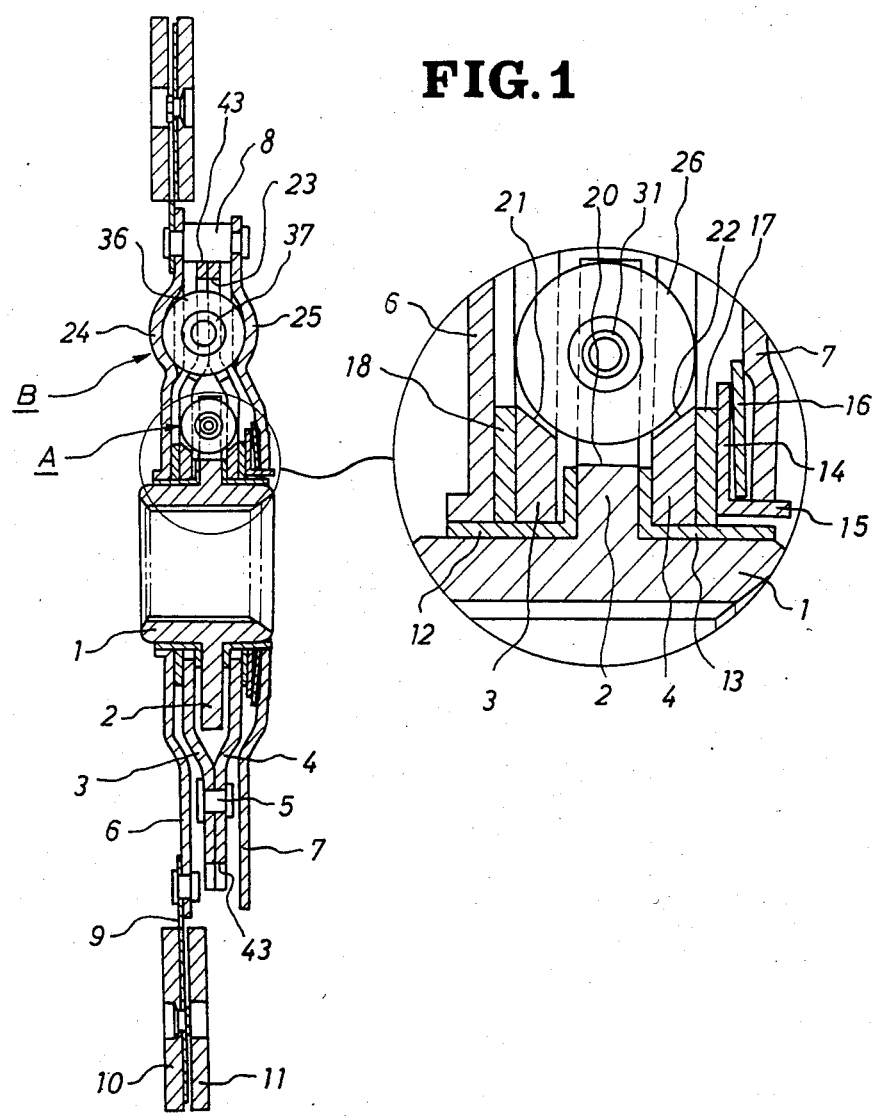
FIG. 1 is a sectional view of a damper disc of an embodiment of the present invention.

Referring to FIG. 1, a hub 1 is adapted to be splined to an output shaft or a drive shaft (not shown). The hub 1 is integrally provided with a radial flange 2 having a small diameter. A pair of annular sub-plates 3 and 4 are disposed with one on each side of the flange 2 and rotatably fitted around the hub 1. Both sub-plates 3 and 4 are bent at their radially middle portions. The radially middle and outer portions of the sub-plates 3 and 4 are closely adjacent in general radial alignment with the small flange 2 and are fixed together by rivets 5.

Annular side plates 6 and 7 (a clutch plate and a retaining plate) are disposed on corresponding sides (axially outside) of the sub-plates 3 and 4 and are rotatably fitted around the hub 2. Both side plates 6 and 7 are fixed together by stop pins 8. Annularly disposed cushioning plates 9 are fixed to the outer peripheral portion of the side plate 6. A pair of friction facings 10 and 11 are fixed to respective surfaces of the cushioning plates 9. Although not shown, the facings 10 and 11 are positioned between a flywheel of an engine and a pressure plate.

As shown in an enlarged part of FIG. 1, bushings 12 and 13 are disposed between the outer periphery of the hub 1 and the inner peripheries of the plates 3, 4, 6 and 7. Each bushing 12 and 13 has radial flanges positioned between the flange 2 and the associated plates 3 and 4. An annular friction plate 14 is interposed between the sub-plate 4 and the side plate 7. The friction plate 14 has axial projections engaged unrotatably with the side plate 7. A conical spring 16 is interposed between the friction plate 14 and the side plate 7. Friction washers 17 and 18 are interposed respectively between the sub-plates 4 and 3 and the side plates 7 and 6.

Figure 2:
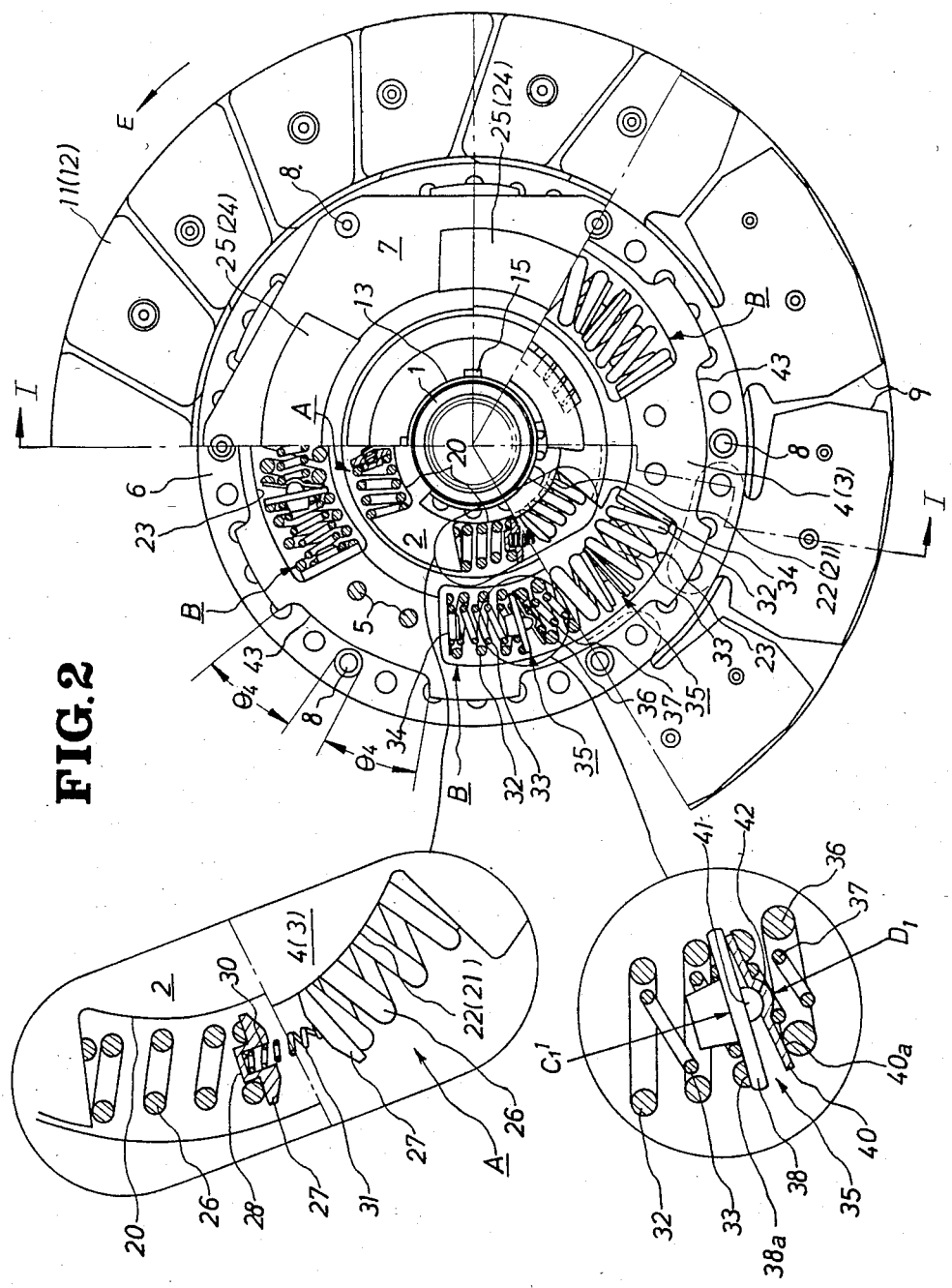
FIG. 2 is an elevational view of the disc of FIG. 1 with certain parts cut away.

Referring to FIG. 2, the flange 2 is provided at the outer periphery with three circumferentially spaced recesses or openings 20. Both sub-plates 3 and 4 are provided with openings 21 and 22 registering with the openings 20. The openings 20, 21 and 22 form three circumferentially spaced opening parts A. The sub-plates 3 and 4 are provided at the radially outer portions with circumferentially three spaced openings 23 which continue to the openings 21 and 22. The side plates 6 and 7 are provided with curved portions or hollows 24 and 25 which axially register with the openings 23. These openings 23 and the hollows 24 and 25 form three circumferentially spaced openings parts B.

As shown in an enlarged part of FIG. 2, A pair of compressible coil springs 26 are disposed substantially circumferentially in each opening part A. Opposite ends of each pair of the springs 26 are seated on the edges of the opening part A. A pair of spring seats 27 of a spring seat unit is interposed between the adjacent ends of the paired springs 26. Each spring seat 27 supports the end of the adjacent spring 26 and has a projection 28 fitted into the spring 26. A compressible coil spring 31 which is smaller and softer than the spring 26 is circumferentially disposed between the pair of the spring seats 27. Each spring seat 27 has a hollow 30 into which the end of corresponding of the spring 31 is fitted.

Referring to FIG. 2, a pair of compressible coil springs 32 are circumferentially disposed in each opening part B. A pair of compressible coil springs 33 having a small diameter are disposed coaxially in the springs 32. Opposite ends of the paired springs 32 and 33 are seated on the edges of the opening parts B through the spring seats 34. Coaxially arranged compressible coil springs 36 and 37 having large and small diameters are disposed in series between the springs 32 and 33 with spring seat unit 35 therebetween. As shown in the enlarged part of FIG. 2, each spring seat unit 35 includes a pair of spring seats 38 and 40. The spring seats 38 and 40 each have support surfaces 38a and 40a to which the springs 32 and 33 and the springs 36 and 37 are seated. In the illustrated neutral position, the surface 38a of the spring seat 38 is substantially perpendicular to the center line or the compression direction C1 of the springs 32 and 33. The surface 40a of the spring seat 40 is substantially perpendicular to the center line or the compression direction D1 of the springs 36 and 37. The spring seat 38 is made, e.g., by forging and has a projection 41. The spring seat 40 with a spherical surface is provided with a spherically hollow seat 42 in which the projection 41 is rotatably seated, so that the directions of the support surfaces 38a and 40a can be changed relative to each other.

As is apparent from FIG. 2, said stop pins 8 extend through the recesses 43 provided at the outer peripheral portions of the sub-plates 3 and 4. In the illustrated neutral position, circumferential spaces of angles $\theta 4$ are formed between the stop pins 8 and the edges of the recesses.

Characteristics of said springs and other members are so determined that the disc may function as follows.

Operation can be as follows. In the engaging operation of the clutch, the facing 10 in FIG. 1 is pressed by the pressure plate against the flywheel, and thus, the rotational force is transmitted from the flywheel to the facing 10, and then, is transmitted through the cushioning plate 9 to the side plates 6 and 7. The force is further transmitted from the side plates 6 and 7 through the springs 32, 33, 36 and 37 to the sub-plate 3 and 4, and then, is transmitted from the sub-plates 3 and 4 through the springs 26 and 31, the flange 2 and hub 1 to the output shaft. In this manner, the whole disc rotates in the direction of an arrow E. While the foregoing force or torque is small, the coil springs 31 and 26 are largely compressed, so that the plates 3, 4, 6 and 7 twist substantially or torsionally turn with respect to the flange 2 and the hub 1.

Figure 3:
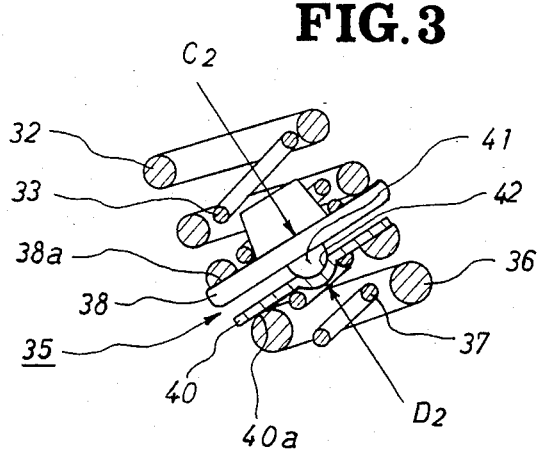
FIG. 3 is an enlarged sectional view of springs in the disc of FIG. 1.

When the torque increases to a predetermined value, the springs 31 as well as the springs 26 are fully compressed, and thereafter, the springs 32 and 33 are mainly compressed, so that the side plates 6 and 7 largely twist with respect to the sub-plates 3 and 4 and the flange 2. As the springs 32 and 33 are largely compressed, the springs 32 and 33 are well as the springs 36 and 37 change their compression directions illustrated by lines C2 and D2 in FIG. 3, respectively. When the directions change, the projections 41 turn on the seat 42 and the spring seats 38 and 40 turn with respect to each other, so that the surfaces 38a and 40a are maintained perpendicular to the directions C2 and D2.

After the springs 32 and 33 are fully compressed, the springs 36 and 37 are largely compressed until the stop pins 8 engage the edges of the recesses 43.

Figure 4:
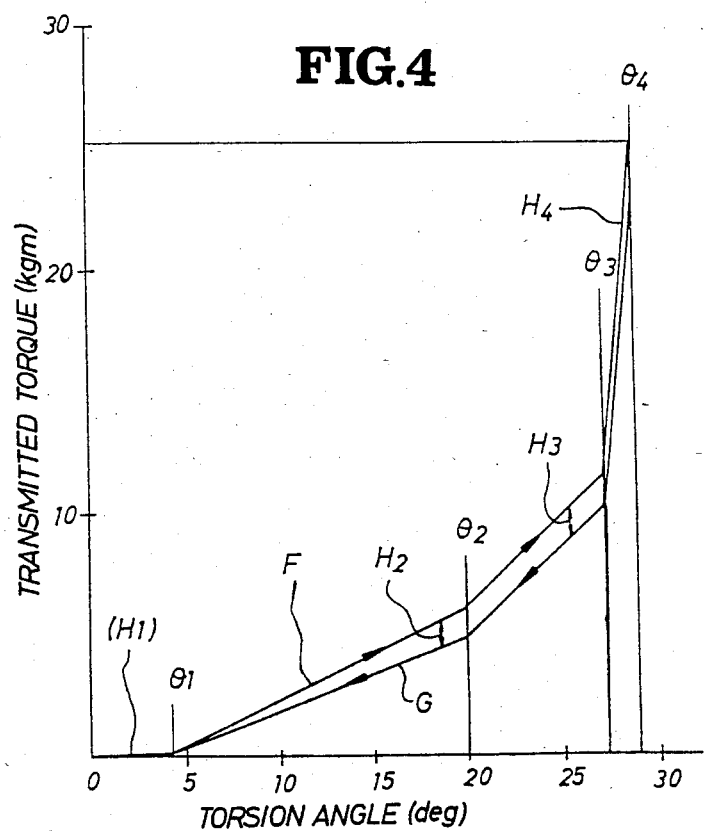
FIG. 4 is a graph indicating a relationship between a torsion angle and a transmitted torque.

The above operations will be described hereinafter in connection with the graph in FIG. 4 which illustrates a relationship between the torque and the torsion angle. In the first step ($\theta 0$-$\theta 1$), primarily the springs 31 are compressed. In the second step ($\theta 1$-$\theta 2$), primarily the springs 26 are compressed. In the third step ($\theta 2$-$\theta 3$), primarily the springs 32 and 33 are compressed. In the fourth step ($\theta 3$-$\theta 4$), primarily the springs 36 and 37 are compressed. As is apparent from FIG. 4, as the torsion angle increases, the rigidity against the torsion between the side plates 6 and 7 and the flange 2 increases.

In the first and second steps, hysteresis torques H1 and H2 are generated by the friction between the flange 2 and the sub-plates 3 as were as 4 and others. In the third and fourth steps, hysteresis torques H3 and H4 are generated by the friction between the sub-plates 3, 4 and the side plates 6, 7 as well as others. An upper line F in FIG. 4 indicates a characteristic when the torque increases, and a lower line G indicates a characteristic when the torque decreases. Although not illustrated, when the torque changes in a negative direction, the members operate similarly and reversely to the operation described above.

In modifications of the invention, one compressible coil spring may be used instead of the respective two coaxial springs. Instead of the three sets of the springs with the spring seats units 35 therebetween, two sets or four or more sets of springs may be disposed in series. Instead of the closed hollows 24 and 25, the side plates 6 and 7 may be provided with open openings. The spring seat units can be used in other types of clutch disc for automobiles. For example, spring seat units of the invention may be employed in a disc which does not include sub-plates, in which case the spring seat units are interposed between springs in openings formed in flange and side plates of a disc. The invention may be used as a clutch disc of an agricultural machine or an industrial machine or as a damper of a boats or other device.

Although the invention has been described in its preferred form with a certain degree of particularity, it is understood that the present disclosure of the preferred form may be changed in the details of construction and that the combination and arrangement of parts may be resorted to without departing from the spirit and scope of the invention as hereinafter claimed.

What is claimed is:

1. A damper disc comprising:
   an input member adapted to be connected to a torque input part to coaxially rotate therewith, including an opening;
   an output member adapted to be connected to an output shaft to rotate coaxially to the input member, including an opening;
   spring mechanisms disposed in the openings of the input member and the output member to circumferentially connect the input member and the output member;
   said spring mechanisms including a plurality of torsion springs disposed in series and a spring seat unit interposed between adjacent torsion springs, both ends of each spring mechanism being connected to the input and output members, said spring seat unit including
   a first spring seat to which one of the adjacent torsion springs is seated,
   a second spring seat to which the other of the adjacent torsion springs is seated and
   a connecting means for connecting both spring seats together so that both spring seats can change their orientation with respect to the radial direction of the disc.

2. A damper disc of claim 1 wherein each connecting means includes a projection formed in said one spring seat and a hollow formed in said other spring seat, and said projection is rotatably fitted in said hollow.

3. A damper disc of claim 2 wherein said projection and said hollow are spherical, respectively.

4. A damper disc of claim 1 wherein said connecting means includes a soft connecting spring having a small diameter and disposed between both spring seat, and said soft connecting spring is adapted to be fully compressed so that both spring seat units may contact together before the springs at both sides thereof are fully compressed.

5. A damper disc of claim 4 wherein said spring seats are provided with hollows into which the connecting spring enters.

6. The damper disc of claim 5 wherein each spring seat includes a first side having a projection extending into one of the torsion springs and a second side having a deep recess, the recess extending through the seat and into the projection on the first side, and a corresponding end of the soft connecting spring is received and held by the recess.

7. A damper disc comprising:
side plates adapted to be connected to a torque input part to coaxially rotate therewith;
a hub adapted to be connected to a torque output part to rotate coaxially to the side plates;
a sub-plate adapted to torsionally turn with respect to the side plates and the hub and disposed coaxially thereto;
a first spring mechanism circumferentially connecting the sub-plate to the hub; and
a second spring mechanism circumferentially connecting the side plates to the sub-plate;
said spring mechanisms including a plurality of torsion springs disposed in series and spring seat units interposed between adjacent torsion springs, said spring seat units including
a first spring seat to which one of the adjacent torsion springs is seated,
a second spring seat to which another one of the adjacent torsion springs is seated and
a connecting means for connecting both spring seats together so that both spring seats can change their orientation with respect to the radial direction of the disc.

8. A damper disc of claim 7 wherein each connecting means includes a projection formed in said one spring seat and a hollow formed in said other spring seat, and said projection is rotatably fitted in said hollow.

9. A damper disc of claim 8 wherein said projection and said hollow are spherical, respectively.

10. A damper disc of claim 7 wherein said connecting means includes a soft connecting spring having a small diameter and disposed between both spring seat, and said soft connecting spring is adapted to be fully compressed so that both spring seat units may contact together before the springs at both sides thereof are fully compressed.

11. A damper disc of claim 10 wherein said spring seats are provided with hollows into which the connecting spring enters.

12. The damper disc of claim 11 wherein each spring seat includes a first side having a projection extending into one of the torsion springs and a second side having a deep recess, the recess extending through the seat and into the projection on the first side, and a corresponding end of the soft connecting spring is received and held by the recess.

* * * * *